United States Patent [19]
Bianco et al.

[11] Patent Number: 5,793,502
[45] Date of Patent: Aug. 11, 1998

[54] SECURE OPTICAL IDENTIFICATION MEANS AND METHOD WITH ENHANCED VARIABILITY

[76] Inventors: James S. Bianco, 217 Brainard Rd., Enfield, Conn. 06082; David J. Horan, 100 Loomis Ridge, Westfield, Mass. 01085

[21] Appl. No.: 593,089

[22] Filed: Jan. 29, 1996

Related U.S. Application Data

[63] Continuation-in-part of Ser. No. 497,778, Jul. 3, 1995, Pat. No. 5,627,663, which is a continuation of Ser. No. 115,412, Aug. 31, 1993, abandoned.

[51] Int. Cl.$^6$ .................... G03H 1/00; G02B 5/18; G06K 7/10
[52] U.S. Cl. .................... 359/2; 359/572; 235/457
[58] Field of Search .................... 359/1, 2, 3, 572; 283/85, 86; 430/1; 235/457

[56] References Cited

U.S. PATENT DOCUMENTS

| | | |
|---|---|---|
| 5,083,850 | 1/1992 | Mallik et al. .................... 359/1 |
| 5,085,514 | 2/1992 | Mallik et al. .................... 359/2 |
| 5,513,019 | 4/1996 | Cueli .................... 359/2 |

*Primary Examiner*—Paul M. Dzierzynski
*Assistant Examiner*—Audrey Chang
*Attorney, Agent, or Firm*—John H. Crozier

[57] ABSTRACT

In a preferred embodiment, secure optical identification, including: a first lacquer layer; a metallic layer disposed on a first surface of the first lacquer layer, with a first surface of the metallic layer in contact with the first surface of the first lacquer layer; a diffraction pattern embossed in the first surface of the first lacquer layer through the metallic layer; a pattern formed in the metallic layer by demetallizing areas of the metallic layer; and a second lacquer layer, having the same refractive index as that of the first lacquer layer, disposed on a second surface of the metallic layer so as to fill in voids adjacent the diffraction pattern caused by the demetallizing areas of the metallic layer.

12 Claims, 2 Drawing Sheets

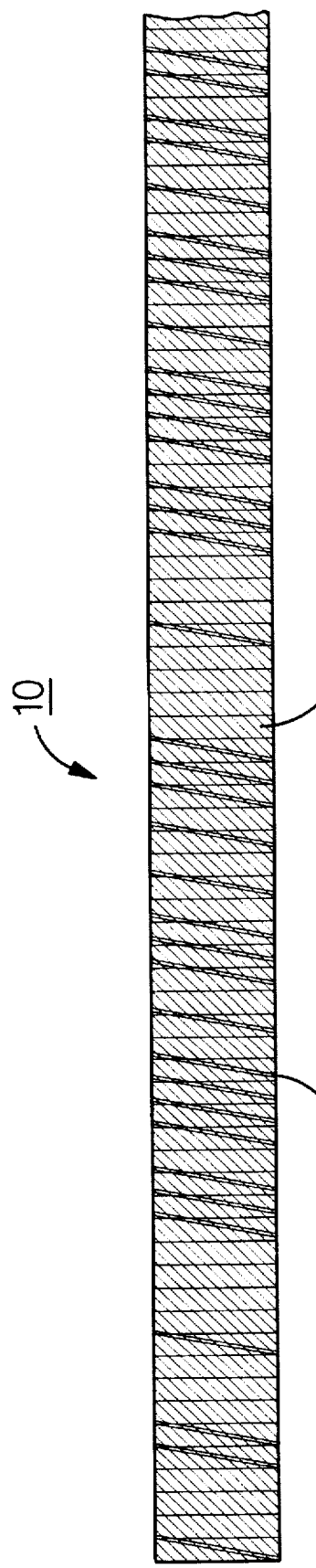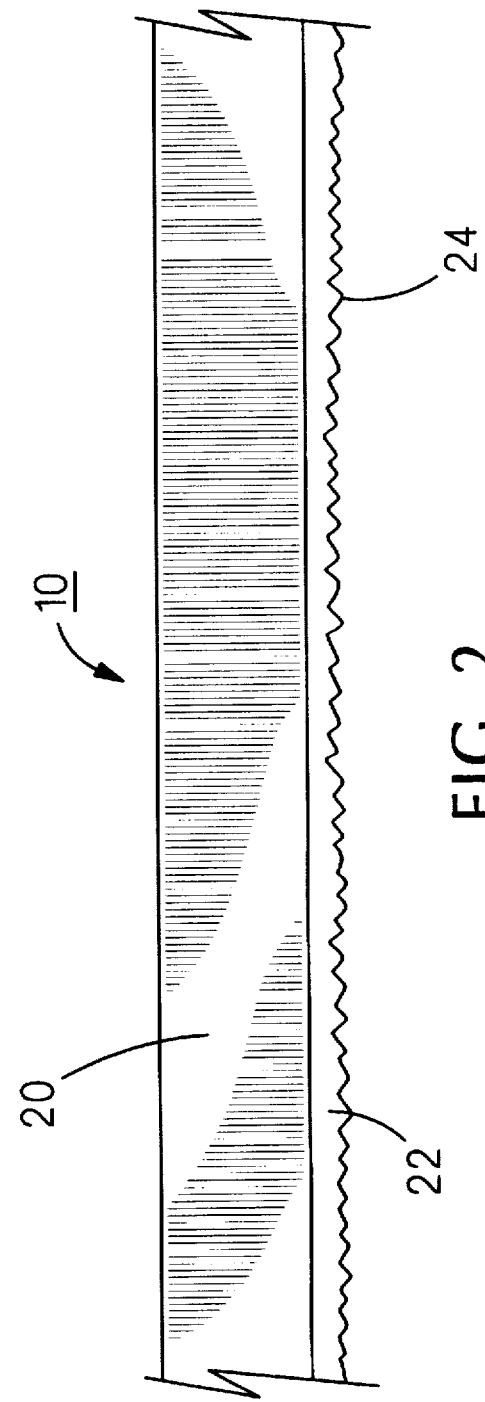

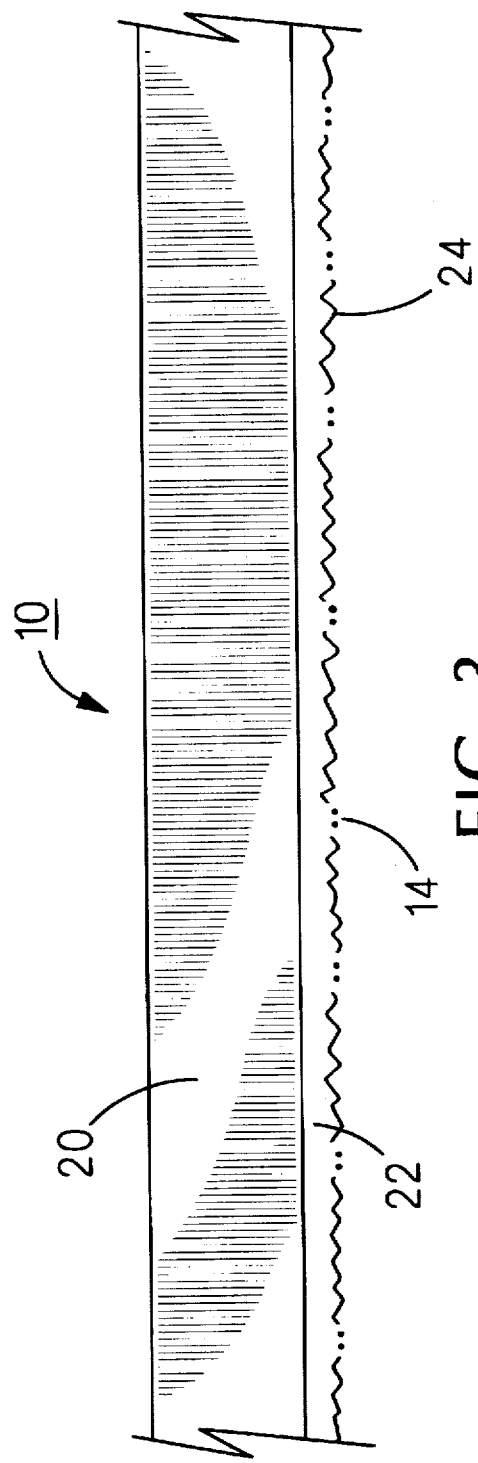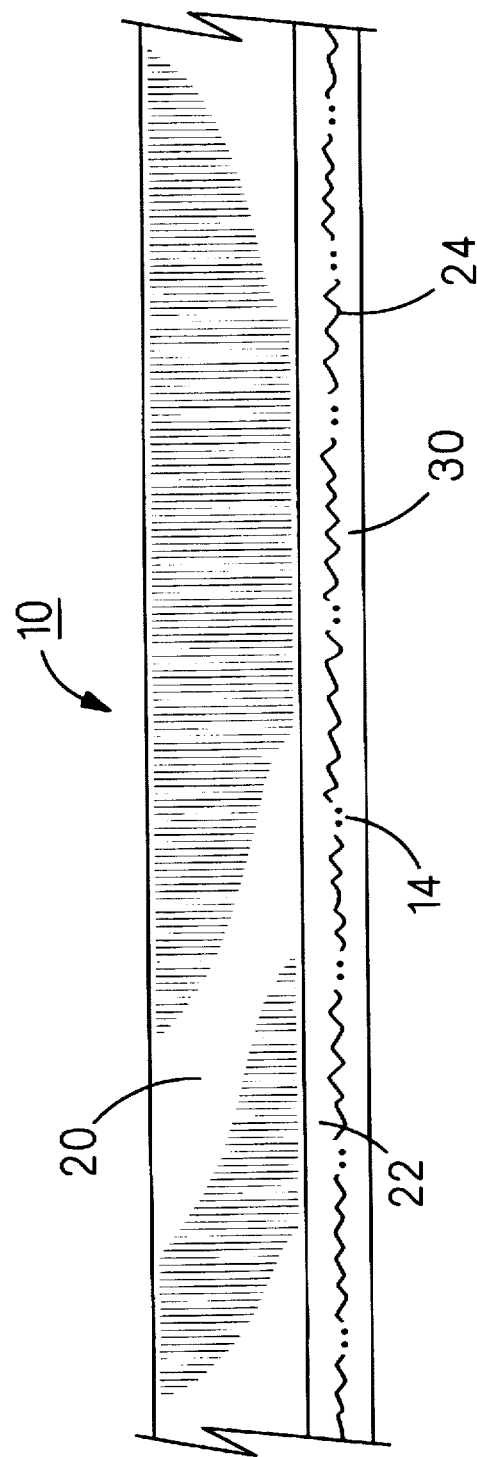

SECURE OPTICAL IDENTIFICATION MEANS AND METHOD WITH ENHANCED VARIABILITY

CROSS-REFERENCE TO RELATED APPLICATIONS

The present application is a continuation-in-part of application Ser. No. 08/497,778, filed Jul. 3, 1995, now U.S. Pat. No. 5,627,663, which is a continuation of Ser. No. 08/115,412, filed Aug. 31, 1993, now abandoned, both titled SECURE OPTICAL IDENTIFICATION METHOD AND MEANS, the disclosures of which applications are incorporated by reference hereinto.

BACKGROUND OF THE INVENTION

1. Field of the Invention

The present invention relates to means and methods to combat forgeries and unauthorized duplication of valuable articles generally and, more particularly, but not by way of limitation, to novel means and method for enhancing the variability of optical identification means and methods used for such.

2. Background Art

The above-referenced applications disclose security indicia which preferably comprise a strip of a random series of diffraction grating elements, each of the diffraction grating elements diffracting light in one of at least three different planes. The diffraction grating strip is "read" by serially illuminating the diffraction grating elements and detecting the transitions between changes in plane of diffracted light, preferably without the use of a clock. The pattern of changes represents an identifying code. Alternatively, security indicia may be of a known type which includes a magnetic or optical clock for the reading of a hologram or other type of diffraction grating security indicia. The applications also disclose means and methods by which the security indicia can be employed to authenticate articles on which the security indicia are placed.

An important consideration in producing the above security indicia is that there be a high degree of variability between individual security indicia produced so that duplication of a particular individual security indicia is exceedingly rare. To address this consideration, the above-referenced applications disclose that second security indicia may be placed on the strip of diffraction grating elements. In the preferred embodiment disclosed therein, the second security indicia comprises a bar code placed randomly on the diffraction grating strip. The bar code may be printed on the strip with a rotogravure or other printing process or the bar code may be formed by demetallizing areas of the strip, with a laser or thermal printer, for example, where the bars are to appear. This procedure may take place when the strips are manufactured or it can take place when the strips are affixed to articles at which time they can be "personalized" to encode therein information as to the article and/or its bearer, thus virtually eliminating any possibility of duplication of security indicia.

A potential problem with the demetallization process is that the areas of demetallization still contain the embossed diffraction gratings in a lacquer substrate and these diffraction gratings can still be read using the techniques described in the above-referenced applications.

Accordingly, it is a principal object of the present invention to provide means and method to enhance the variability of secure optical identification means.

It is a further object of the invention to provide such means and method that prevent demetallized diffraction gratings from diffracting light.

It is an additional object of the invention to provide such method and means that are economical to implement and use.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a secure optical identification means, comprising: a first lacquer layer; a metallic layer disposed on a first surface of said first lacquer layer, with a first surface of said metallic layer in contact with said first surface of said first lacquer layer; a diffraction pattern embossed in said first surface of said first lacquer layer through said metallic layer; a pattern formed in said metallic layer by demetallizing areas of said metallic layer; and a second lacquer layer, having the same refractive index as that of said first lacquer layer, disposed on a second surface of said metallic layer so as to fill in voids adjacent said diffraction pattern caused by said demetallizing areas of said metallic layer.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which:

FIG. 1 is a top plan view of a diffraction grating strip including thereon a bar code.

FIGS. 2 and 3 are a greatly enlarged, side elevational views showing intermediate steps in producing a diffraction grating strip with a bar code, according to the present invention.

FIG. 4 is a greatly enlarged, side elevational view of a diffraction grating strip with a bar code, according to the present invention.

DETAILED DESCRIPTION OF THE PREFERRED EMBODIMENTS

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

FIG. 1 illustrates optical security indicia, generally indicated by the reference numeral 10, which includes a random series of diffraction grating elements, as at 12, such as described in the above-referenced patent applications, each of the diffraction grating elements diffracting light in one of at least three different planes. The diffraction grating strip is "read" by serially illuminating the diffraction grating elements and detecting the transitions between changes in plane of diffracted light, without the use of a clock. The pattern of changes represents an identifying code. Alternatively, optical security indicia 10 may be of a known type which includes a magnetic or optical clock for the reading of a hologram or other type of diffraction grating security indicia.

Placed on the diffraction grating strip is a bar code comprising a series of bars, as at 14. As noted above, bars 14 may be printed on the strip with a rotogravure or other printing process or the bar code may be formed by demetallizing areas of the strip with a laser or thermal printer, for example, where the bars are to appear. This procedure may take place when the strips are manufactured or it can take place when the strips are affixed to articles at which time they can be "personalized" to encode therein information as to the article or its bearer, thus virtually eliminating any possibility of duplication. Bars 14 are shown on FIG. 1 as being slanted relative to the major axis of optical security indicia 10, but they may also be orthogonal to the major axis.

FIG. 2 illustrates optical security indicia 10 as normally produced. Indicia 10 includes a relatively thick carrier substrate 20 of polyethylene terephthalate having disposed on a surface thereof a 3- to 4-micron-thick layer 22 of a lacquer material. On the surface of the lacquer material is a 0.5-micron-thick metallic layer 24 of a metal such as aluminum. Metallic layer 24 is placed in contact with an embossing roll (not shown) which embosses a diffraction grating pattern into lacquer layer 22 through the metallic layer. Were there to be no further processing of indicia 10, the indicia would be attached to an article such as a credit card (not shown) by suitable means, with metallic layer 24 adjacent the article.

FIG. 3 illustrates indicia 10 in which areas of metallic layer 24 have been demetallized, by any of the foregoing methods or others, to form bars 14 (FIG. 1). As is noted above, it has been found that, when diffraction gratings 12 are read, bars, or demetallized areas, 14 can still be read as diffraction gratings, lacquer layer 22 underneath metallic layer 24 is the element that retains the diffraction grating patterns and the reason bars 14 can still be read is due to the difference in refractive indexes between the lacquer material and the voids underneath the lacquer layer.

FIG. 4 illustrates indicia 10 which has been further treated according to the present invention. Here, a second layer of lacquer 30, having the same refractive index as lacquer layer 22, has been placed over metallic layer 24 to fill in the voids in the areas of bars 14; consequently, the difference in refractive indexes between the lacquer layers is zero and a light beam striking the areas of bars 14 will simply pass through the lacquer layers and the absence of diffraction gratings 12 will be recorded as the bars.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

We claim:

1. Secure optical identification means, comprising:
   (a) a first lacquer layer;
   (b) a metallic layer disposed on a first surface of said first lacquer layer, with a first surface of said metallic layer in contact with said first surface of said first lacquer layer;
   (c) a diffraction pattern embossed in said first surface of said first lacquer layer through said metallic layer;
   (d) a pattern formed in said metallic layer by demetallizing areas of said metallic layer; and
   (e) a second lacquer layer, having the same refractive index as that of said first lacquer layer, disposed on a second surface of said metallic layer so as to fill in voids adjacent said diffraction pattern caused by said demetallizing areas of said metallic layer.

2. Secure optical identification means, as defined in claim 1, wherein: said demetallized areas are laser-etched.

3. Secure optical identification means, as defined in claim 1, wherein: said demetallized areas are thermally demetallized by a thermal printer.

4. Secure optical identification means, as defined in claim 1, wherein: said pattern formed in said metallic layer is a bar code.

5. A method of producing secure optical identification means, comprising:
   (a) providing a first lacquer layer;
   (b) placing a metallic layer on a first surface of said first lacquer layer, with a first surface of said metallic layer in contact with said first surface of said first lacquer layer;
   (c) embossing a diffraction pattern in said first surface of said first lacquer layer through said metallic layer;
   (d) producing a pattern in said metallic layer by demetallizing areas of said metallic layer; and
   (e) placing a second lacquer layer, having the same refractive index as that of said first lacquer layer, on a second surface of said metallic layer so as to fill in voids adjacent said diffraction pattern caused by said demetallizing areas of said metallic layer.

6. A method of producing secure optical identification means, as defined in claim 5, further comprising: using laser-etching to produce said demetallized areas.

7. A method of producing secure optical identification means, as defined in claim 5, further comprising: using a thermal printer to produce said demetallized areas.

8. A method of producing secure optical identification means, as defined in claim 5, further comprising: providing said pattern formed in said metallic layer as a bar code.

9. Secure optical identification means, comprising:
   (a) a first lacquer layer;
   (b) a metallic layer disposed on a first surface of said first lacquer layer, with a first surface of said metallic layer in contact with said first surface of said first lacquer layer;
   (c) a diffraction pattern embossed in said first surface of said first lacquer layer through said metallic layer;
   (d) a bar code pattern formed in said metallic layer by demetallizing areas of said metallic layer; and
   (e) a second lacquer layer, having the same refractive index as that of said first lacquer layer, disposed on a second surface of said metallic layer so as to fill in voids adjacent said diffraction pattern caused by said demetallizing areas of said metallic layer.

10. A method of producing secure optical identification means, comprising:
   (a) providing a first lacquer layer;
   (b) placing a metallic layer on a first surface of said first lacquer layer, with a first surface of said metallic layer in contact with said first surface of said first lacquer layer;
   (c) embossing a diffraction pattern in said first surface of said first lacquer layer through said metallic layer;
   (d) producing a pattern in said metallic layer by using laser-etching to demetallize areas of said metallic layer; and (e) placing a second lacquer layer, having the same refractive index as that of said first lacquer layer, on a second surface of said metallic layer so as to fill in voids adjacent said diffraction pattern caused by said demetallizing areas of said metallic layer.

11. A method of producing secure optical identification means, comprising:

(a) providing a first lacquer layer;

(b) placing a metallic layer on a first surface of said first lacquer layer, with a first surface of said metallic layer in contact with said first surface of said first lacquer layer;

(c) embossing a diffraction pattern in said first surface of said first lacquer layer through said metallic layer;

(d) producing a pattern in said metallic layer by using a thermal printer to demetallize areas of said metallic layer; and (e) placing a second lacquer layer, having the same refractive index as that of said first lacquer layer, on a second surface of said metallic layer so as to fill in voids adjacent said diffraction pattern caused by said demetallizing areas of said metallic layer.

12. A method of producing secure optical identification means, comprising:

(a) providing a first lacquer layer;

(b) placing a metallic layer on a first surface of said first lacquer layer, with a first surface of said metallic layer in contact with said first surface of said first lacquer layer;

(c) embossing a diffraction pattern in said first surface of said first lacquer layer through said metallic layer;

(d) producing a bar code pattern in said metallic layer by demetallizing areas of said metallic layer; and (e) placing a second lacquer layer, having the same refractive index as that of said first lacquer layer, on a second surface of said metallic layer so as to fill in voids adjacent said diffraction pattern caused by said demetallizing areas of said metallic layer.

\* \* \* \* \*